June 3, 1952 — L. E. COULTER — 2,598,975
TOOL OR DIE AND HOLDER ASSEMBLY
Filed April 2, 1948
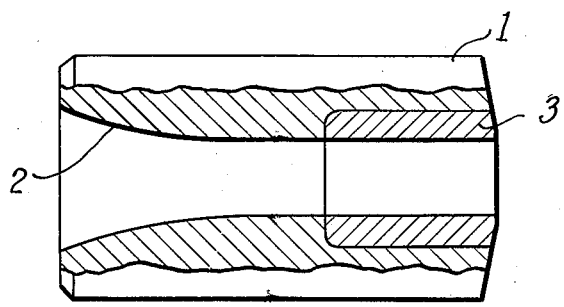
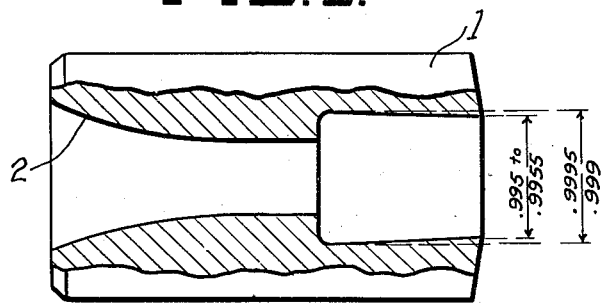
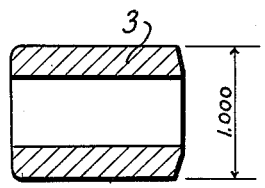
INVENTOR.
Leland E. Coulter
BY
ATTORNEYS

Patented June 3, 1952

2,598,975

UNITED STATES PATENT OFFICE 2,598,975

TOOL OR DIE AND HOLDER ASSEMBLY

Leland E. Coulter, Ann Arbor, Mich., assignor to Allied Products Corporation, Detroit, Mich., a corporation of Michigan Application April 2, 1948, Serial No. 18,643

2 Claims. (Cl. 164—58)

This invention relates to a new tool holder and tool assembly of the press-fit type and also relates to a method of locating dies and tools in their holders.

In many tools such as certain dies, punches and shearing tools it is necessary to use very hard metal such as high speed steel, Stellite or tungsten carbide, of which "Carboloy" is a representative. These substances are very brittle and, consequently, it is either necessary or desirable to encase them in a sheath of steel which is not so hard and much tougher by reason of having greater shock resistance. I prefer to use chisel steel for the sheathing or holder but other steels or metals may be used. Another reason for enclosing the die or tool proper in a sheath of softer but tougher steel is to save expense as the tungsten carbides and high speed tool steel are very expensive.

It is customary now to press-fit the tool or cutter die into a socket made in the sheathing or holder. The insert is usually two or three thousandths oversize and it is forced into the undersized opening by great pressure or pressure aided by heating the holder to give it a temporary expansion.

I have discovered that an inserted die, tool or other piece of hard metal press-fitted into an undersize opening has a very much greater pressure or constriction on the insert at the bottom of the cavity than at the opening. This has two undesirable results that I believe have not been previously recognized. One is that it unduly loads the inner end of the insert with an undesirable pressure and often cracks the fragile tool or die and the other is that the holding or grip of the tool in the socket is often insufficient to securely hold the die or tool at the outer end, hence sufficient vibration and strain takes place to fracture the fragile die or tool.

I have discovered a way to anchor and locate a tool or die in a holder or sheath which will make for better operation of the tool and prolong the life of the tool and die holder several times the previous life of such an assembly. I accomplish this by "back tapering" it or gradually under-cutting or conically dove-tailing the socket in the sheath and press fitting the oversized tool or die in this type of socket.

Referring to the drawings:

Figure 1 is an elevation partly in longitudinal section of a die press-fitted into a holder. This is a die for cooperating in the shearing of heavy wire or rod stock.

Figure 2 is a similar view showing the holder before the die is press-fitted thereinto.

Figure 3 is a longitudinal section of the die.

The holder or sheath is designated 1. It is provided on one end with a flared opening 2 to receive and guide the heavy wire or rod stock into the die 3.

Refer to Figure 2, the tool or die receiving socket is here shown to be a back tapered or conically dove-tailed or undercut. It will be noted from the dimensions in Figure 2 that the diameter of the socket at the open end is .995 to .9955 of an inch. The diameter of the bottom of the socket is .999 of an inch to .9995 of an inch. Referring to Figure 3, the O. D. of the die is 1.000 of an inch. The length of the die is approximately an inch. I find the above dimensions or I. D.'s for the socket appropriate for a die of one inch O. D. and one inch length and made of high speed tool steel. There will be some variation for dies of different diameters and of different materials. These will have to be worked out by trial and experiment. I have found the above dimensions for the socket and die most desirable for the example that I have given. The hardness of the high speed tool steel die in the example I have given is from 58 to 60 Rockwell, the hardness of the chisel steel used in the holder is from 45 to 50 Rockwell.

There is a tolerance of five ten thousandths of an inch in the I. D. at the bottom end at the opening of the recess or socket in the sheath with the dimensions shown in Figures 2 and 3 it will be apparent that there is an oversize of die of about five thousandths at the opening of the socket and an oversize of about one thousandths at the base of the socket. I have found that with this back taper or this progressively greater oversize of the die or tool as one progresses toward the opening of the socket results in equalizing the pressure or the gripping of the tool or die along its entire length so that the pressure or the compressive grip on the tool or die is substantially the same at the outer end as it is at the inner end. Hence excessive load on the inner end of the die or tool is relieved and by reason of the greater oversize at the opening of the tool socket a much better grip is secured on the tool or die at this location so as to greatly minimize any vibrations and strain that are calculated to fracture the tool.

Greater oversize can be tolerated at the opening of the socket than is possible at the bottom of the socket. Here the mass of metal that forms a sheath is less able to yield than at the opening of the socket. In fact it cannot perceptively yield because at the base of the socket the sidewalls of the socket are tied together by the metal of the end wall. Bearing in mind this tie at the end of the socket it will be apparent that the permissive yield of the walls of the socket to expansion progresses gradually from the bottom of the socket to the opening of the socket. This back taper takes advantage of this progressively greater yield going from the bottom to the opening of the socket. So there is a tendency to equalize the grip and the pressure on the tool or die all along the length of the socket. The results is that the stress or the strains in the die or tool are substantially uniform and less liable to crack or fracture the tool or die. Actual tests have shown that the life of a tool or die fitted in its holder in the way that I have described is greatly prolonged and the tool is better adapted to do its work.

I have found that an unexpected result follows the use of this way of locating the tool or die in its holder. I find that the compressive forces are such that the hardness of the metal in the tool or die is enhanced some two points in the Rockwell scale. This distinguishes from the prior practice because the constrictive forces are considerably less due to the fact that it has not been possible to use so much oversize where the tool and socket are of uniform diameter their entire length.

I have found that it is possible to get similar results by using a socket of uniform diameter and tapering the insert, tool or die, from the outer to the inner end; say, make the inner end of the insert one thousandth of an inch oversize and the outer end of the insert about five thousandths oversize. These dimensions would be with one inch diameter and a one inch length insert and the metals above given, tool steel and chisel steel.

Of course, the socket could be back-tapered less than that given above and the insert also tapered and a compromise in tapers thus made. But much of the best and easiest way to do the job is to back taper the socket alone as I have described in the beginning of the specification.

What I claim is:

1. A tool or die and holder assembly having in combination a holder of metal having a socket and a tool or die mechanically and longitudinally press-fitted into said socket, one of said members being so tapered that the tool or die is before the press fitting considerably greater oversize at the opening of the socket than at the bottom of the socket whereby the compressive force on the die or tool tends to uniformity along their entire length, the oversize of the tool or die with respect to the socket being of the order of approximately five thousandths of an inch at the opening of the socket and one thousandth of an inch at the base of the socket in an assembly where the die is substantially one inch in diameter and in length and constructed of high speed tool steel and the holder is constructed of chisel steel.

2. A tool or die and holder assembly having in combination a holder of metal having a socket and a tool or die mechanically and longitudinally press-fitted into said socket, the holder being so back tapered that the tool or die is before the press fitting considerably greater oversize at the opening of the socket than at the bottom of the socket whereby the compressive force on the die or tool tends to uniformity along their entire length, the oversize of the tool or die with respect to the socket being of the order of approximately five thousandths of an inch at the opening of the socket and one thousandth of an inch at the base of the socket in an assembly where the tool or die is substantially one inch in diameter and length and constructed of high speed tool steel and the holder is constructed of chisel steel.

LELAND E. COULTER.

REFERENCES CITED

The following references are of record in the file of this patent:

UNITED STATES PATENTS

| Number | Name | Date |
|---|---|---|
| 307,428 | Borden | Nov. 4, 1884 |
| 674,522 | Seib | May 21, 1901 |
| 2,146,995 | Simons | Feb. 14, 1939 |
| 2,171,323 | Wyland | Aug. 29, 1939 |
| 2,245,608 | Rogers | June 17, 1941 |
| 2,277,338 | Luginbill et al. | Mar. 24, 1942 |
| 2,350,465 | Keshian | June 6, 1944 |
| 2,354,656 | Annesley | Aug. 1, 1944 |